April 22, 1941.  M. MALLORY  2,239,395
VEHICULAR SYSTEM
Filed April 14, 1939  5 Sheets-Sheet 1

MARION MALLORY
INVENTOR

BY Barnes, Kisselle, Laughlin & Raisch
ATTORNEYS.

April 22, 1941.                  M. MALLORY                   2,239,395
                              VEHICULAR SYSTEM
                    Filed April 14, 1939          5 Sheets-Sheet 2

INVENTOR
MARION MALLORY
BY
ATTORNEYS.

April 22, 1941.  M. MALLORY  2,239,395

VEHICULAR SYSTEM

Filed April 14, 1939   5 Sheets-Sheet 3

MARION MALLORY
INVENTOR

BY
Barnes, Kisselle Laughlin & Raisch
ATTORNEYS.

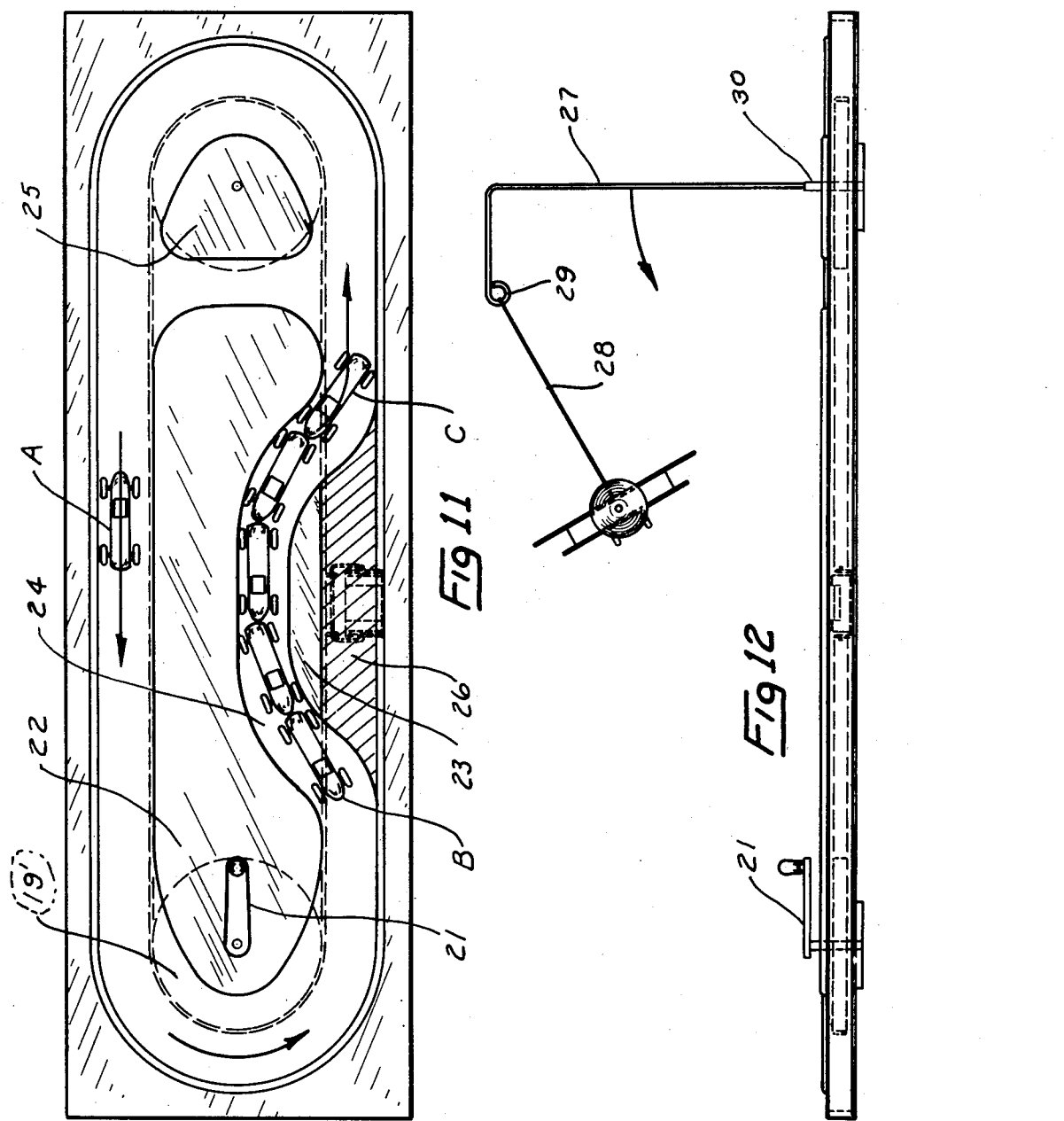

April 22, 1941.   M. MALLORY   2,239,395
VEHICULAR SYSTEM
Filed April 14, 1939   5 Sheets-Sheet 5

INVENTOR
MARION MALLORY
BY
ATTORNEYS.

Patented Apr. 22, 1941

2,239,395

UNITED STATES PATENT OFFICE 2,239,395

VEHICULAR SYSTEM

Marion Mallory, Detroit, Mich.

Application April 14, 1939, Serial No. 267,949

3 Claims. (Cl. 104—148)

This invention relates to a roadway and means for propelling light weight vehicles or the like over said roadway by concealed magnetic energy and using mechanical means in conjunction with the propelling means for controlling the steering of said vehicles on said roadway. Although not at all limited in use, nevertheless this roadway lends itself to use as a toy.

Another object of the invention is to mechanically operate other toys by an overrunning connection, such as Ferris wheels, merry-go-rounds, airplanes, etc., with the same mechanical means that is used to convey the magnets under the roadway.

Another object of the invention is to use a roadway wide enough on which vehicles of both narrow and wide gauge can operate.

Another object of the invention is to provide a roadway on which vehicles are propelled by concealed means and to provide additional pressure to the weight of the vehicle so that its wheels will be held tightly against the roadway surface to prevent them from climbing over the guide rail, thereby steering the vehicle by the guide rail.

A still further object of my invention is to construct a roadway on which light vehicles are propelled by concealed magnetic energy, said roadway having detours from the main roadway and means for placing an obstruction guide rail so as to cause the vehicles to detour from the main roadway and be forced back onto the main roadway as soon as the detour is filled with vehicles. In other words, as one vehicle is forced into the beginning of the detour, it forces another vehicle onto the roadway at the other end of the detour. The latter vehicle is picked up by the roadway magnet.

Figure 1:
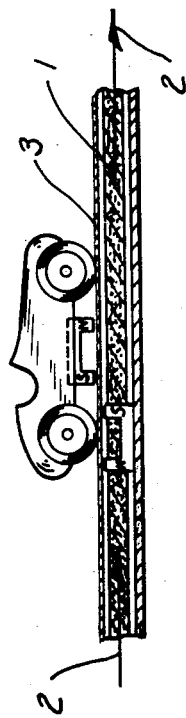

I am aware of the fact that it is not new to operate toys and the like by concealed magnetic energy. However, it has been impossible to obtain a satisfactory steering or directional control when the steering of the toy or vehicles was entirely dependent upon the magnetic power used for propelling them. The following difficulties were encountered:

For example see Fig. 1. The vehicle has a magnet that has a north and south pole, shown at $n$ and $s$. Underneath the non-magnetic roadway 3 is another magnet that has unlike poles $n$ and $s$ and that is attached to belt 1 and moved in a direction indicated by arrows 2 to propel the vehicle.

Figure 2:
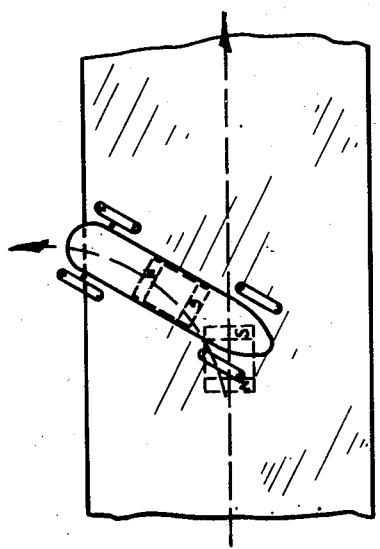

Supposing, as illustrated in Fig. 1, the vehicle is placed on the roadway and the vehicle magnet is not located directly over the roadway magnet. In moving the roadway magnet in the direction indicated by arrow to cause the vehicle to move, the south pole of the roadway magnet would move towards the south pole of the vehicle magnet. Naturally, being like poles, they would oppose and repel each other. The north pole of the vehicle magnet would be attracted to the south pole of the roadway magnet and the vehicle would have a tendency to turn around or steer away from the path of travel of the roadway magnet, as indicated in Fig. 2.

Of course, the repulsion action would not take place if the vehicle were located over the roadway magnet so that all unlike poles would be together, but this would not be satisfactory because, before the vehicle could be put into operation, the vehicle magnet must be located directly over the roadway magnet. The vehicle could not be placed on the track aind then the roadway magnet moved under it because the vehicle would travel away from the line of travel of the roadway magnet, as indicated in Fig. 2, due to the repulsion action of like poles of the magnets.

Figure 3:
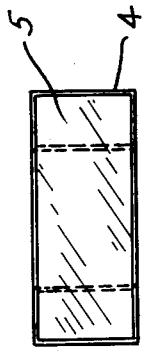
Figure 4:
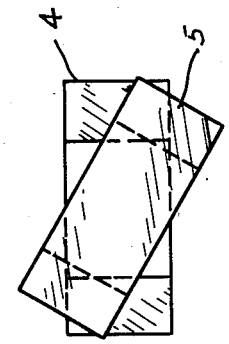

Even though the vehicle magnet were placed directly over the roadway magnet still other difficulties than those mentioned above would be encountered. First, it is practically impossible to mechanically rotate one magnet and cause another magnet to rotate simultaneously unless the other magnet is pivoted on a bearing that is almost frictionless, such as used in compasses, etc., because there is a slippage action between the magnets. See Fig. 3. If the mounting on which magnet 4 is rotated offers any friction resistance when being rotated, magnet 5 will move a great distance, as indicated in Fig. 4, before magnet 4 will move. Naturally, the reluctance or resistance between the two magnets will be increased, which, in turn, decreases the magnetic attraction or power between the two magnets. By this alone it can be seen that the vehicle cannot be steered satisfactorily entirely by the roadway magnet even on the straightaway of the roadway, and it would be impossible to steer the vehicle around the turns because the roadway magnet would follow the conveyer around the turns, but the vehicle being held down tightly to the roadway by the attraction of the magnets would increase the friction on the wheels against the roadway and cause the vehicle to continue to drive or travel in a straight line instead of following the roadway magnet.

Of course, the vehicle magnet and roadway magnet could be turned 90°; that is, located cross-ways in the vehicle and cross-ways under the roadway to eliminate the repulsion action, but this would necessitate the use of a wider vehicle and a greater space to accommodate the magnet under the roadway, and even through the unlike poles would always correspond with each other, it would be practically impossible to prevent the vehicle wheels from steering the vehicle from the course of the roadway magnet for the reasons explained above.

For further explanation, I realize that, if the vehicle magnet were not supported on a vehicle or carried by wheels, but was placed so that it made direct contact with the roadway, it would follow the roadway magnet fairly well both on the straightaway and around the turns, but there would be considerable jumping action in its movement forward, due to the friction between it and the roadway, causing it to lag behind the roadway magnet. The vehicle magnet would have a surging action. In other words, it would lag behind the roadway magnet and then jump forward to catch up.

By mounting a vehicle on the vehicle magnet so that the wheels could not touch the roadway, it would be possible to steer the vehicle around the track, but the friction would be so great due to the sliding action of the vehicle magnet on the track that a tremendous amount of power would be required to operate the conveyer system in moving the vehicle. In addition to this, the surface of the roadway would become scored and eventually destroyed.

Another thing, the observation of the vehicle jumping around the track without being carried or steered by the wheels would not be a satisfactory reproduction of a vehicle in operation.

It can be seen by the above explanation that it is practically impossible to get any satisfactory measure of control of steering by depending entirely upon magnetic means, and it is also impossible to accomplish the other things that are essential and that have been explained above.

Referring to the drawings of my invention (see Fig. 5), 6 is the vehicle front wheels. 7 is the vehicle magnet. 8 is the surface of the roadway. 9 is the roadway magnet. Preferably the magnets 7 and 9 are U magnets as shown. 10 is the conveyer belt. 11 is a roadway curb or guide rail. 12 is a clip attached to conveyer belt 10. 13 is a connector in the form of a bail pivotally connected to clip 12 and roadway magnet 9.

14 is a rear vehicle wheel (Fig. 6). 15 is the vehicle frame. 16 is a non-metallic spacer.

Figure 7:
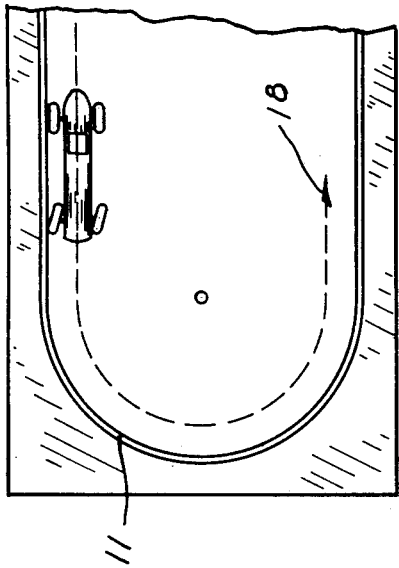
Figure 8:
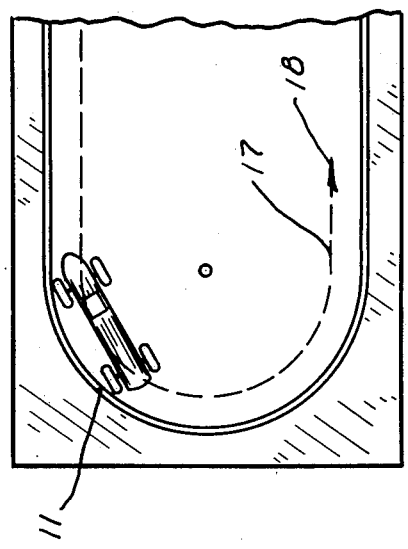

Figs. 7 and 8 are views looking downwardly on the roadway surface showing curb or guide rail 11 and path of travel of concealed roadway magnet 9 indicated by dotted line 17 and direction of travel of roadway magnet indicated by arrow 18.

Figure 10:
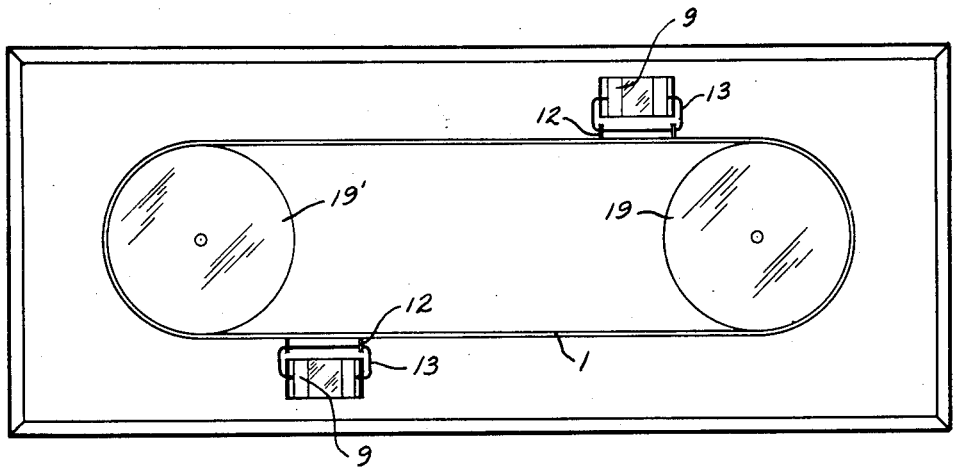

Fig. 10 is a view of the conveyer system located under the roadway. 19 and 19' are pulleys on which belt 1 is carried. 19' is the driving pulley. 9 are the roadway magnets. 13 is the swivel connection between clip 12 and the roadway magnet 9.

Fig. 11 is a view looking downwardly on the roadway. 21 is a crank connected to the belt driving pulley. 22, 23 and 25 are raised islands in the center of the roadway and also act as curbs for detour 24. 26 is a removable piece used to block the roadway, which causes the vehicles to be forced into detour 24.

Fig. 12 is a side view of the roadway showing an airplane driven by the idle pulley of the conveyer system. 27 is the shaft that supports the airplane. 28 is another shaft that suspends the airplane at a swivel connection 29.

Figure 13:
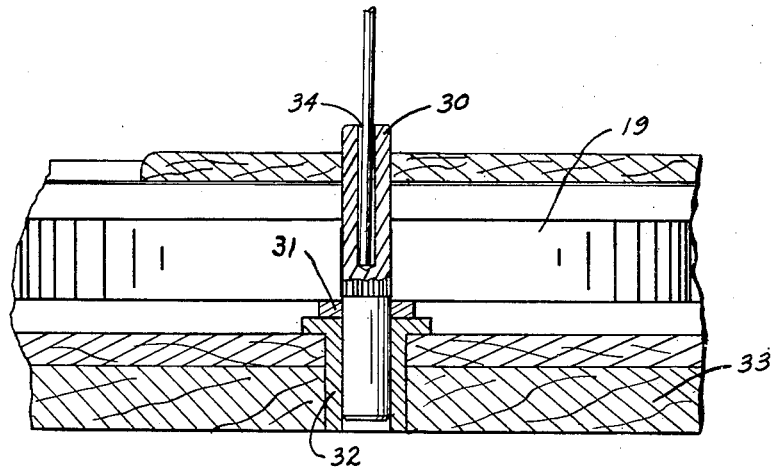

Fig. 13 is a further detailed construction of the invention. 30 is a shaft rigidly connected to belt pulley 19. 31 is a thrust washer. 32 is a flange bearing rigidly fastened into the lower bed 33 of the roadway. 34 is a small bore in shaft 30 for inserting loosely other shafts for driving airplanes, Ferris wheels, merry-go-rounds, etc.

Figure 14:
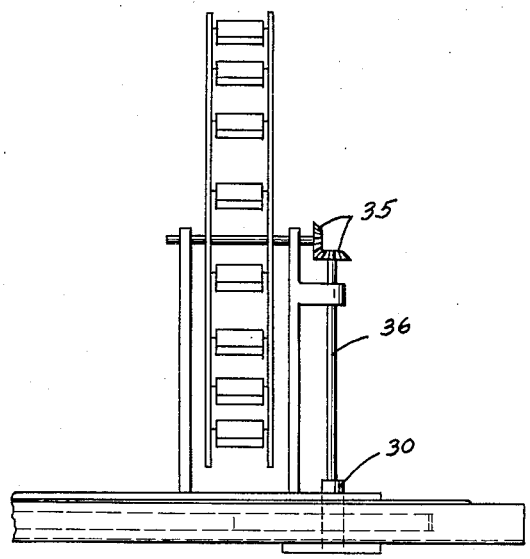

Fig. 14 shows how a Ferris wheel is mounted on the roadway. 35 are beveled gears and shaft 36 is loosely mounted into pulley shaft 30, as shown in Fig. 13.

Figure 5:
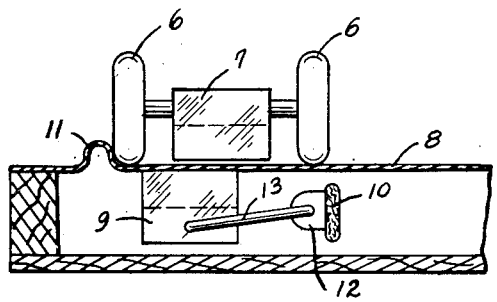

The operation of the vehicles, merry-go-rounds, Ferris wheels, etc., on the roadway is as follows:

Referring to Fig. 5. It will be observed that there is a clearance between vehicle magnet 7 and roadway 8. It is preferable to have a small clearance between the vehicle magnet and the roadway to prevent the magnet from dragging on the track and setting up friction, as previously explained.

Figure 9:
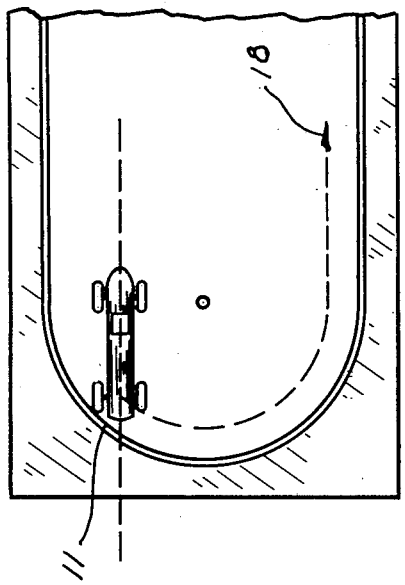

The roadway magnet 9 is slightly offset from the vehicle magnet 7 so as to hold the vehicle close to curb 11 (see Fig. 5). This is essential because it will cause the vehicle to run in a straight line adjacent to the curb and will come into the turns as shown in Fig. 8. If the roadway magnet were located so as to cause the vehicle to travel a distance from the curb, the vehicle would travel as indicated in Fig. 9 and the vehicle would hit the curb squarely, forcing it to make a sharp quick turn, and it would tend to go over the curb instead of making the turn. If the wheels were not lined up 100% or the magnet under the roadway did not travel 100% parallel to the roadway, due to being loosely connected on the belt, the vehicle would be guided from the course of the lower magnet. This condition would also cause the vehicle to hit the curb more squarely, as indicated in Fig. 9, and it would tend to go over the curb. It is evident from the above that the vehicle is steered along the roadway 8 by the conjoint action or cooperation of the curb 11 and the magnets 7 and 9.

In Fig. 7, it will be observed that the front wheels of the vehicle are turned so that they point slightly toward the curb. This is another method I use to cause the vehicle to travel adjacent to the guide rail.

Figure 6:
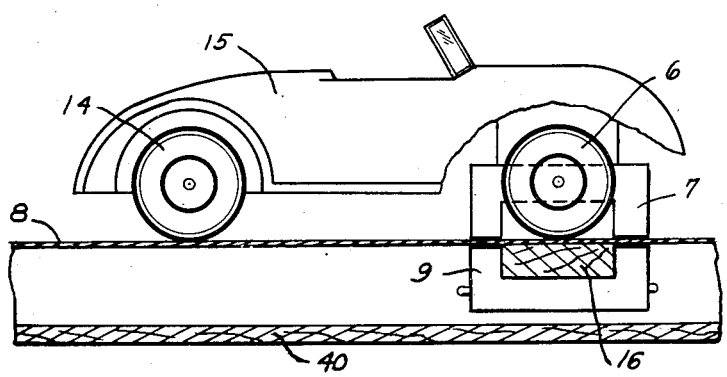

In Fig. 6, 16 is a spacer preferably of non-metallic material such as wood, which slides underneath the roadway surface. The spacer 16 is secured to the roadway magnet 9 and projects slightly beyond the upper surface of the magnet 9 so that the magnet 9 is also spaced slightly from the lower face of road 8. This non-metallic spacer prevents cutting of the undersurface of the roadway and also reduces the friction load. It will be seen that the vehicle magnet is rigidly carried by the vehicle so that it has a slight clearance with the upper face of road 8 which prevents it from sliding on the roadway surface. The connection 13, shown in Fig. 5, pivots on the roadway magnet 9 and clip 12 so as to permit the magnet 9 to ride squarely with the lower surface of the roadway and to also permit the magnet to ride squarely on the bottom 40 of the conveyer housing when there is not a vehicle located over it. It is understood that the magnet 9 will drop down upon bottom 40 if the vehicle with magnet 9 is removed because there is nothing to attract or hold it to the top surface other than the magnet carried by the vehicle.

Referring to Fig. 11. As crank 21 is moved in the direction indicated by arrow, the vehicles on the roadway will move in the direction indicated by arrows. It is understood that the crank 21 can be replaced with an electric motor or other power to operate the conveyer in place of manual operation. If it is desired to pass the vehicles through the detour 24, it will be necessary to use approximately six vehicles (of course, this depends upon the length of the detour) and place the removable block 26 in the roadway between island 23 and rail 11 which shuts off the roadway. As the vehicle A moves around, it will be unable to follow the roadway magnet on a straight course and will be forced against vehicle B. This action pushes vehicle C on the roadway, and the roadway magnet that was under vehicle A will pick up vehicle C. Naturally, there will always be one vehicle running on the roadway, and they move in and out of the detour in rotation, similar to taxicabs at a terminal station.

When operating other devices, such as airplanes, Ferris wheels, merry-go-rounds, etc., I find it necessary to use an overrunning mechanical connection between the drive shaft 30 and the device that is to be operated. For example, see Fig. 12. If shaft 27 were rigidly connected to shaft 30 and the airplane were in motion, as shown, and then the operator would bring the roadway conveyer to a sudden stop, the airplane would wrap around shaft 27. In other words, it would be impossible to operate the airplane, merry-go-round, etc., smoothly without an overrunning means. On a fast acceleration of the roadway conveyer, the mechanically operated toys would also jerk badly.

In the arrangement for flying a toy airplane the connection between rod 28 and shaft 27 is such that the airplane can swing up and down but cannot swivel. The shaft 27 has a loose fit in socket 34 in shaft 30 of the driven pulley 19. The loose fit between the lower end of the shaft 27 and the socket 34 acts as a slip and overrunning clutch. Hence, when the pulley 5 is turned, shaft 27 slips with respect to socket 34 and thus rotates at a slower rate than the pulley. This causes the airplane to ride around in a circlie and gradually elevate. As the airplane picks up speed the centrifugal force increases which in turn increases the clutch pressure between shaft 27 and socket 34. This increase in pressure decreases the slippage between shaft 27 and socket 34 until finally the shaft turns at the same rate as the pulley and the airplane continues to fly in a circle. When the pulley 5 stops turning the shaft 27 and the airplane gradually decelrate and the airplane gradually settles down to its starting position.

Figure 15:
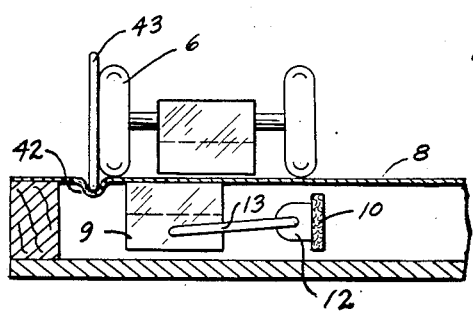

In Fig. 15 I have shown a modified arrangement for steering the vehicle along the roadway.

In this form of the invention the road is provided with a groove 42 and the outer front wheel of the vehicle is provided with a flange in the form of disk 43 which rides in the groove 42. As the vehicle is propelled by the magnetic drive, as above described, it is guided along the roadway by cooperation of the flange 43 and the groove 42.

Figure 16:
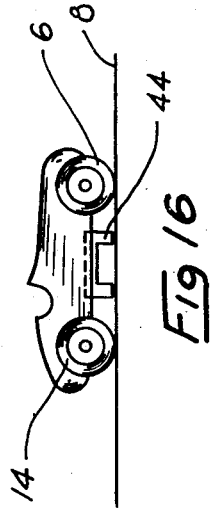

Instead of each vehicle being provided with a magnet the vehicle can be provided with a U-shaped block 44 of magnetic material, see Fig. 16. The U-shaped iron block 44 is carried by the vehicle so that it has a slight clearance with the roadway to avoid friction.

To better cooperate with the guide rail 11, the wheels of the vehicle should preferably be made from a hard substance having a low coefficient of friction, such as hard rubber or hard thermoplastic or thermosetting materials.

I do not wish to be limited to the use of the type of vehicles shown in the drawings. It is understood that, if I prefer, I may use vehicles connected together in the form of small trains, tractors, etc. It is also understood that where it is desired to use long wheel base vehicles, the wheels may be located on trucks, so as to facilitate better steering around the turns.

I claim:

1. A vehicular system comprising a curved road, a wheeled vehicle arranged to travel along said road, a rail running along the said road, means responsive to magnetic attraction carried by the said vehicle, a magnetic drive for said vehicle arranged to travel beneath the road for attracting the said magnet responsive means and driving the vehicle along the road guided by said rail, said magnetic drive being located with respect to the magnet responsive means and said rail so that a forward wheel of the vehicle hugs the rail at all times as it travels along the said road.

2. A vehicular system comprising a road, a wheeled vehicle arranged to travel along said road, a rail running along the said road, means responsive to magnetic attraction carried by the said vehicle, a magnetic drive for said vehicle arranged to travel beneath the said road including a magnet positioned laterally between said rail and magnetic responsive means so that the pull of the magnet causes a forward wheel of the vehicle to hug the rail as the magnet drives the vehicle along the road whereby the vehicle is guided by the rail and kept on the road.

3. In a vehicular system, comprising a road of non-magnetic material, a curb or guide rail extending along said road, a vehicle having magnetic material which travels on said road, a magnet carried under said road to attract said vehicle, said magnet being offset from said magnetic material toward said rail whereby the magnet pulls the vehicle against said rail to steer the vehicle in cooperation with the said curb or guide rail.

MARION MALLORY.